May 9, 1933.  J. F. O'CONNOR  1,908,532
CAR DOOR CONSTRUCTION
Filed Jan. 30, 1930
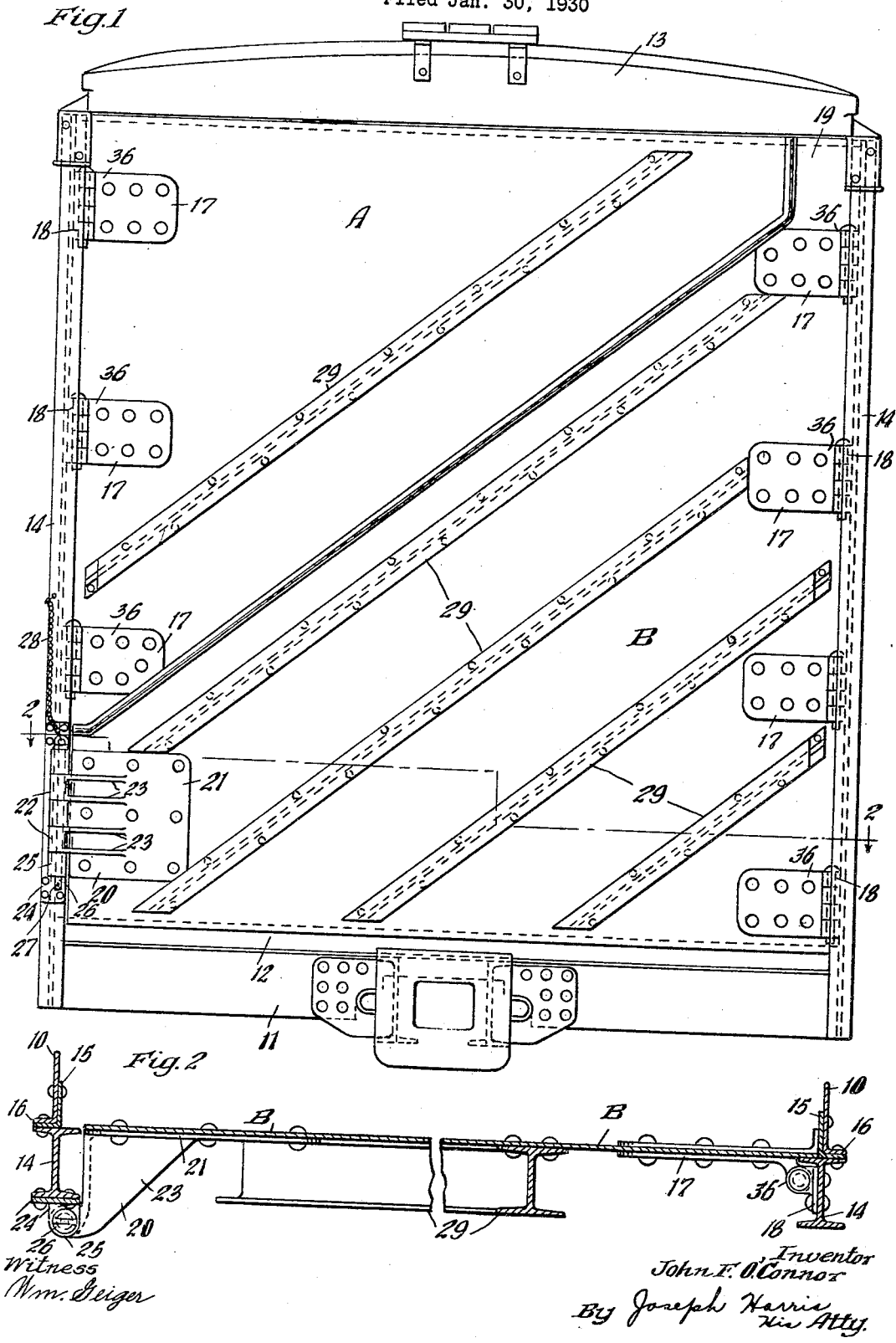
Witness
Wm. Geiger
Inventor
John F. O'Connor
By Joseph Harris
His Atty.

Patented May 9, 1933

1,908,532

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

CAR DOOR CONSTRUCTION

Application filed January 30, 1930. Serial No. 424,476.

This invention relates to improvements in car door construction, especially designed for use in connection with railway cars of the automobile type.

One object of the invention is to provide a double door construction of exceptionally great strength, especially designed for use as end doors for freight cars of the automobile type, wherein the doors have their meeting edges disposed diagonally, whereby each door member extends substantially across the width of the car, thus giving great strength to resist outward end thrusts exerted by the lading within the car.

Another object of the invention is to provide a door structure of the character described in the preceding paragraph, wherein the double door structure includes a door member extending entirely across the lower portion of the door opening and has both ends anchored to the opposite side walls of said opening, one end edge being hinged to one of said walls and the other end edge being locked to the other wall when the door is closed, thereby providing a substantially continuous bracing wall across the end of the car.

Other objects of the invention will more clearly appear from the description and claims hereinafter following.

In the drawing, forming a part of this specification, Figure 1 is an end elevational view of a railway car of the automobile type, illustrating my improvements in connection therewith, the truck structure and associated parts being omitted in this view. Figure 2 is a transverse, horizontal, sectional view corresponding substantially to the line 2—2 of Figure 1.

In said drawing, 10—10 designate the side walls of the car, 11 the end sill, 12 the threshold of the end door, 13 the transverse roof structure forming the upper member of the door frame.

In carrying out my invention, I provide a pair of vertically disposed reinforcing I-beams 14—14 at the rear ends of the side walls of the car. As clearly shown in Figure 2, each I-beam 14 is so arranged that the web thereof is disposed lengthwise of the car and in alinement with the corresponding side wall 10, the beam being secured to this side wall by means of the inner flange thereof, an angle plate 15 being interposed between said flange and a right angular outstanding flange 16 provided on the wall 10. As shown, the transverse section of the angle plate 15, which is interposed between the flange of the I-beam and the flange 16 of the wall 10 is fixed to the beam and said wall by means of rivets extending through the flanges of said parts. The longitudinally disposed section of each angle plate 15 is also secured to the side wall 10, the same being preferably riveted thereto, as shown. My improved door structure proper comprises a pair of swinging door members A and B, which are supported along their outer edges on the side walls of the door opening, the side walls in the present instance being the side walls 10—10 of the car. Each door member is of substantially triangular outline, as clearly shown in Figure 1. The door member A is of smaller size than the member B. Each of the door members A and B is provided with a plurality of hinge members 36—36 along one edge thereof by which the same is swingingly supported from one of the side walls of the car. As shown in Figures 1 and 2, the hinge members 36, which serve to swingingly support the door member B, are mounted on the I-beam member 14 of the righthand wall 10 of the car, as viewed in Figure 1. The hinge members 36 of the door A are mounted in a similar manner on the I-beam 14 of the other side wall 10 of the car. Each hinge member 36 comprises a strap portion 17 secured to the outer face of the corresponding door and a cooperating hinge member 18 secured to the web of the I-beam member 14 at the same side of the car. As will be clear upon reference to Figure 2, the pivot portion of each hinge 36 is offset outwardly of the door and inwardly of the corresponding I-beam member whereby the corresponding vertical edge of the hinged door member engages in back of the rear flange of the I-beam member 14, thus bracing the door along said edge when closed. The meeting edges of the two door members A and B are disposed along diagonal lines, and the edge portion of the door member B overlaps the corresponding edge portion of the door member A, thereby holding the latter in closed position when the door member B is locked in closed position. The door member A at the upper side thereof terminates short of the righthand side wall of the door opening, as clearly shown in Figure 1, and the upper section of the door member B is provided with an upstanding portion 19 which spans the gap between the side wall of the door opening and the opposed inner vertical edge portion of the door member A. As clearly shown in Figure 1, the lower portion of the door member B extends entirely across the door opening and has the lefthand edge portion thereof locked to the I-beam 14 at the corresponding side of the door opening when the doors are closed. In order to secure the door B in closed position, the same is provided with a bracket 20 secured to the outer face thereof, the bracket comprising a flat plate-like section 21 riveted to the door B, and a plurality of locking pin receiving eye members 22—22 formed at the outer ends of outstanding ribs or flange members 23—23 formed integral with the plate member 21. The I-beam member 14 at the lefthand side of the door is provided with a cooperating locking member or bracket 24 provided with a plurality of eye members 25—25 which are adapted to cooperate with the eye members 22—22 of the bracket of the door. The eye members 25 are formed on the outer ends of outstanding webs integral with the plate 24, which plate is riveted to the outer flange of the I-beam 14. The eye members 25 are adapted to engage between the eye members 22 when the door B is closed and a locking pin 26 is inserted within said eye members, as clearly shown in Figures 1 and 2, to secure the door B in locked position. At the lower end, the locking pin or bolt 26 is provided with a seal receiving opening 27 adapted to accommodate the usual car seal. In order to prevent accidental loss of the pin 26 when removed from the eye members, the same is preferably anchored to the eye beam by means of a chain 28.

In order to thoroughly reinforce the door members A and B, and especially the door member B, each of the same is provided with diagonally disposed reinforcing I-beam members 29—29 secured to the outer side thereof. The I-beam members preferably have the webs thereof disposed lengthwise of the car so as to give the maximum reinforcing effect.

From the preceding description taken in connection with the drawing, it will be evident that I have provided an exceedingly rugged end door structure for railway cars, which offers exceptionally great resistance against outwardly directed end thrusts, the lower portion of the door opening being entirely spanned by a single door member which is properly reinforced and anchored at opposite vertical side edges to the opposed side walls of the door opening, being hinged to one of said walls and locked to the other, the hinged edge being locked in back of the flange of the corresponding reinforcing I-beam.

I have herein shown and described what I now consider the preferred manner of carrying out my invention, but the same is merely illustrative and I contemplate all changes and modifications that come within the scope of the claims appended hereto.

I claim:

1. In an end door structure for railway cars, the combination with the side walls of a car; of a pair of door members hinged along their outer edges to said side walls, said door members having their inner meeting edges disposed diagonally across the door opening, each of said door members having bracing and reinforcing means parallel to said diagonal edges.

2. In an end door structure for railway cars, the combination with the side walls of a car; of a pair of door members hinged along their outer edges to said side walls, said doors having the inner meeting edges thereof overlapping and disposed diagonally of the door opening, each door having diagonal braces extending across the same.

3. In an end door structure for railway cars, the combination with the side walls of a car; of a pair of door members hinged along their outer edges to said side walls, each of said door members being of substantially triangular outline and having their meeting edges disposed diagonally across the door opening, each of said doors having bracing means extending diagonally across the same.

4. In an end door structure for railway cars, the combination with the side walls of a car; of a pair of door members having their inner edges disposed diagonally of the door opening and the inner edge of one of said members overlapping the inner edge of the other, said overlapping member having one edge hinged to one side wall of the car and the other edge secured to the other side wall when said doors are closed.

5. In an end door structure for railway cars, the combination with a door opening; of a pair of door members, one of said door members extending entirely across the lower portion of the door opening and having one end edge portion hinged to one of the side walls of the door opening and when closed being locked at the other end edge to the opposed side wall of said door openings; and diagonally disposed beam members reinforcing each of said door members.

In witness that I claim the foregoing I have hereunto subscribed my name this 28th day of January 1930.

JOHN F. O'CONNOR.